E. MORTERUD.
METHOD OF REMOVING SCALE FROM HEATING APPARATUS FOR PULP DIGESTERS.
APPLICATION FILED AUG. 6, 1914.
1,191,451.
Patented July 18, 1916.
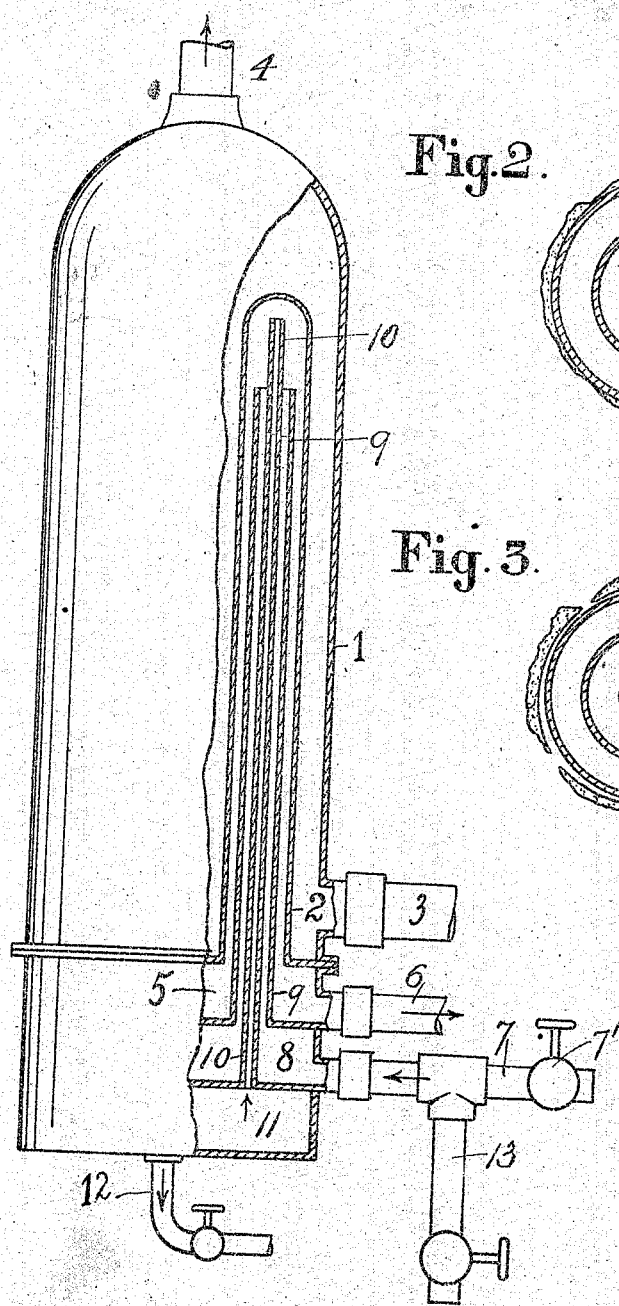
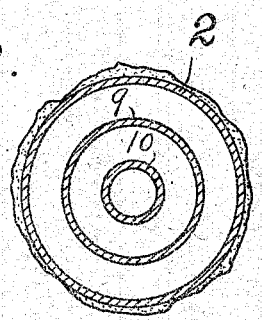
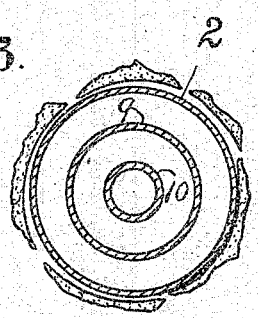
Inventor
Einar Morterud
atty.

UNITED STATES PATENT OFFICE.

EINAR MORTERUD, OF JELÖEN, NORWAY.

METHOD OF REMOVING SCALE FROM HEATING APPARATUS FOR PULP-DIGESTERS.

1,191,451.  Specification of Letters Patent.  Patented July 18, 1916.

Application filed August 6, 1914. Serial No. 855,448.

*To all whom it may concern:*

Be it known that I, EINAR MORTERUD, a subject of the King of Norway, residing at Jelöen, Norway, have invented certain new and useful Improvements in Methods of Removing Scale from Heating Apparatus for Pulp-Digesters; and I do hereby declare the following to be a full, clear, and exact description of the invention, such as will enable others skilled in the art to which it appertains to make and use the same.

My invention relates to the manufacture of pulp or cellulose and more especially to a method for removing the incrustation or scale formed on the tubes and other devices used in apparatus for heating the solution with which the pulp digesters are supplied. When using the indirect system of heating the solution the said formation of scale or incrustation is very detrimental inasmuch as it prevents the transfer of heat.

According to my invention the scale on the outside of tubes may be removed in the following manner. When the tubes mounted in a heating apparatus for pulp digester solution and serving to heat the same by way of steam or hot water passing through the tube, have been covered by incrustation or scale to a certain thickness, I shut off the heating apparatus from the digester and discharge the solution so that the heating apparatus is empty. I then pass steam through the tubes so as to remove the moisture from the scale and make it perfectly dry. By such procedure the tube and the scale thereon will be heated to a somewhat higher temperature than the temperature to which they are heated during the digesting process, because the tube is then cooled by the circulating solution. Therefore the tube and the scale will attain a greater diameter during the drying process and the tubular covering of scale will thereby be ruptured.

When the scale is perfectly dry I shut off the steam or hot water supply to the tubes and cool the tubes rapidly for instance by passing cold water through them. When this is done in a sufficiently rapid way the tubes will be cooled more than the scale surrounding them and for this reason this tubular covering of scale will loosen from the metal tubes which rapidly contract, while the scale tubes remain about of the same diameter; when the scale has in this manner loosened from the tubes it may easily be knocked off or will fall off of itself.

I may also preferably carry out the first part of the method in the way that the drying of the scale is performed by way of a more gentle heating, for instance by steam of somewhat more than 100 centigrade which is below the temperature at which the scale is formed. Thereupon steam of high temperature, say 175° centigrade is passed through the tubes to heat the latter above the temperature at which the scale is formed causing, as above described, the bursting of the scale.

In the accompanying drawing—Figure 1 is an elevation, partly in section of apparatus for heating digesting fluid and in which my method may be carried out. Fig. 2 is an enlarged transverse sectional view of one set of the heating tubes, showing the outer tube, which comes into contact with the digesting fluid, covered with scale. Fig. 3 is a like view showing the scale cracked.

The heating apparatus here shown comprises a heating drum 1 provided with a plurality of vertical tubes 2 (one of which is shown in the drawing). These tubes are closed at the top and are arranged to be surrounded by the digesting solution which is supplied to the drum through a pipe 3 and conveyed to a digester (not shown) through a pipe 4 at the top of the drum. Said tubes communicate at their lower ends with a chamber 5 into which water of condensation from the steam used in heating the tubes passes and is drawn off through pipe 6. The steam, or hot water, used as a heating medium is supplied from a steam or hot water pipe 7 to a chamber 8 from which riser pipes 9 extend into the tubes to near the tops of the latter. The riser pipes being open at their upper ends steam or water will flow therefrom, down between the said pipes 9 and tubes 2 into the chamber 5.

Air that assembles in the tubes 2 may be drawn off from time to time through pipes 10 which extend from a chamber 11 through the upper open ends of the pipes 9; an outlet from the chamber 11 being controlled by a valved pipe 12.

When the tubes 2 become covered with scale, as shown in Fig. 2, the digesting solution is drained from the drum 1, and steam is supplied to the tubes 2, until they expand sufficiently to rupture the scale.

The supply of steam is then shut off by means of the cock 7' in the steam pipe 7 and cold water is then supplied from a pipe 13 to the tubes 2 to rapidly contract them.

I claim—

1. The method of removing scale from the outside of heating tubes in pulp digesters and the like, which method comprises first drying the scale by heating the tubes to a temperature below the temperature at which the scale is formed, subjecting the tubes to a temperature above the temperature at which the scale is formed, and suddenly cooling the tubes to a temperature below either of the aforesaid temperatures.

2. A method of removing incrustation or scale from the outside of heating tubes and the like in heating apparatus for solutions used in pulp digesters and the like comprising the following steps: discharging the solution from the apparatus, passing a heating medium through the tubes to dry the scale by a moderate heat, passing a heating medium of very high temperature through the tubes to heat the tubes to a higher temperature than that to which they are heated during the digesting process, and finally passing a cooling medium through the tubes so as to cause a rapid cooling and contraction of the tubes, thereby loosening the scale from the tubes so it may be knocked off.

3. The method of removing scale from the outside of heating tubes in pulp digesters and the like, which method consists in removing the digesting solution from in contact with the tubes, gradually drying the scale by passing steam through the tubes, subsequently passing steam of very high temperature through the tubes to increase the temperature of the tubes above that to which they are heated during the digesting process, thereby expanding the tubes and simultaneously rupturing the scale, and finally passing cold water through the tubes to rapidly cool and contract them.

In testimony that I claim the foregoing as my invention, I have signed my name in presence of two subscribing witnesses.

EINAR MORTERUD.

Witnesses:
 RUTH LINDSTRÀN,
 CONSTANCE F. HANSEN.